Figures 1, 2:
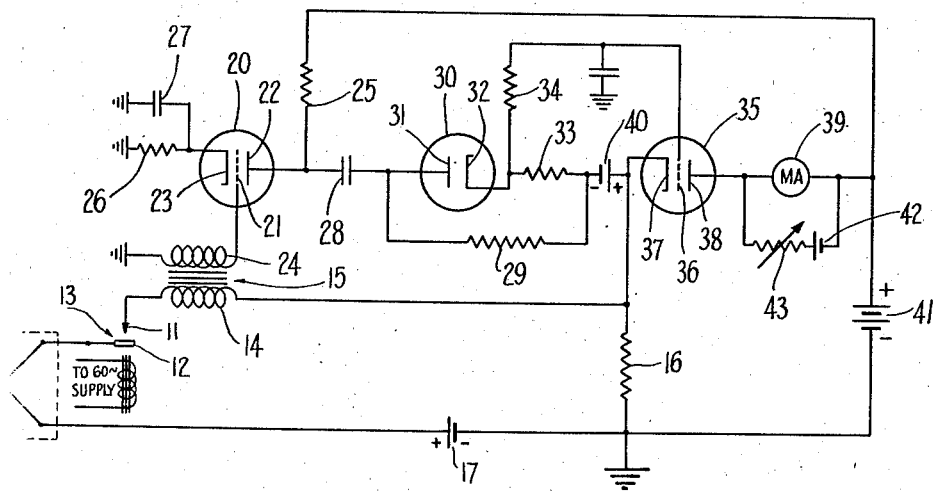

Nov. 21, 1944.    W. B. GAYLORD    2,363,057
ELECTRICAL MEASURING DEVICE
Filed May 11, 1943

WILLIAM B. GAYLORD,
INVENTOR.

ATTORNEY

Patented Nov. 21, 1944

2,363,057

UNITED STATES PATENT OFFICE 2,363,057

ELECTRICAL MEASURING DEVICE

William B. Gaylord, Dobbs Ferry, N. Y., assignor to North American Philips Company, Inc., Dobbs Ferry, N. Y.

Application May 11, 1943, Serial No. 486,607

7 Claims. (Cl. 73—360)

This invention relates to electrical measuring devices and more particularly to a direct reading electronic device for indicating temperature.

An important use of the device of the invention is for measuring the temperature at the hot-junction of a thermocouple and the invention will be described in such use.

It is an object of the invention to provide an electronic temperature measuring device which is simple and accurate and at the same time highly sensitive.

A further object of the invention is to provide an electronic temperature indicator equally adapted for measuring, recording or controlling temperature.

Another object of the invention is to provide an electronic device equally applicable for measuring low temperatures of the order of −250° C. or high temperatures of the order of 1000° C.

A still further object of the invention is to provide an electronic device of variable sensitivity and having a high degree of accuracy both for small temperature ranges, for example of the order of 10° C., and for large temperature ranges of the order of 1000° C. or more.

The thermal voltage generated by a thermocouple is proportional to the difference in the temperatures of the measuring junction and of the reference junction. For accurate temperature measurement it is necessary to maintain the temperature of the reference junction at a constant value or to apply suitable correction factors to compensate for changes in the temperature thereof. It is a further object of the invention to obviate this difficulty and to automatically compensate the effects produced by changes in the temperature of the reference junction of the thermocouple.

These and further objects of the invention will appear as the specification progresses.

The invention will be described with reference to the appended drawing forming part of the specification and in which Figure 1 is a circuit diagram representing the basic operation of the device of the invention.

Fig. 2 represents the preferred embodiment of the invention.

The device shown in Fig. 1 comprises a control tube 35 having a cathode 37, a control electrode 36 and an anode 38. Anode 38 is connected to the positive pole of a suitable source of potential shown as the battery 41 through a temperature calibrated meter 39. Cathode 37 is connected to ground through a resistor 16 across which there is developed a voltage proportional to the current flow through the tube 35, and controlled by potentials applied to the control electrode 36. A battery 40 connected between cathode 37 and the control electrode 36 through resistors 33 and 34 applies a bias voltage to electrode 36 of such value as to operate the tube 35 on the straight line portion of its characteristic. The purpose of the resistor 16 and the effects of the voltage generated across the same by variations of the voltage applied to the control grid 36 will be more fully described later. In practice the steady-state current is balanced out of the meter 39 and this may be effected by a battery 42 and an adjustable resistor 43 shunting the meter.

Connected in shunt with the resistor 16 is a thermocouple circuit comprising a thermocouple 10 connected in series with contacts 11 and 12 of an interrupter 13, the primary winding 14 of a transformer 15 and a battery 17 the latter being so poled as to oppose the voltage developed across resistor 16. The secondary winding 24 of transformer 15 is connected to the control grid 21 of an amplifier tube 20 the anode 22 of which is energized by the battery 41 through a load resistor 25. The operating bias voltage for the tube 20 is derived from a resistor 26 connected between the cathode 23 of the tube 20 and ground which resistor is shunted by a low-impedance by-pass condenser 27.

By means of a condenser 28 anode 22 is coupled to the anode 31 of a rectifier tube 30 the cathode 32 of which is connected to the junction of resistors 33 and 34. Rectifier 30 is so poled that the voltage derived therefrom opposes the bias voltage applied to the tube 35 by the battery 40. A resistor 29 connected between the anode 31 and the junction of resistor 33 and battery 40 serves as a direct current return for the rectifier 30.

The operation of the circuit of Fig. 1 is as follows. By reason of the current flowing through the tube 35 resistor 16 generates a voltage having a fixed component determined by the voltages of batteries 40 and 41 and a variable component determined by the voltage derived from the rectifier 30. The thermocouple 10 is so poled that with increasing temperature the thermal E. M. F. generated adds to the voltage of the battery 17. Moreover, the thermocouple 10 and the battery 17 are so poled that the resulting voltage opposes the voltage generated by resistor 16.

The purpose of the battery 17 is to ensure that the voltage derived from the thermocouple circuit maintains a constant polarity at least throughout the temperature range to be covered. In practice the battery 17 is given such a voltage value that the resulting voltage of the battery and the thermocouple at the lowest temperature to be indicated is equal to the steady state voltage of resistor 16.

At all temperatures above the temperature at which the resulting voltage of the thermocouple and the battery 17 is equal to the steady state voltage across resistor 16 a current flows in the thermocouple circuit and this current when modulated by the interrupter 13 induces in the transformer winding 24 a proportional alternating voltage. The voltage so induced is amplified by the tube 20 and thereafter rectified by the tube 30 which rectified voltage is applied to the grid 36 of control tube 35 in such sense as to oppose the voltage of battery 40. The increase in anode current of the tube 35 correspondingly deflects the meter 39 and simultaneously increases the voltage across resistor 16.

The voltage developed by resistor 16 stabilizes at a value which approaches but does not equal the voltage generated by the battery 17 and the thermocouple in series. It will appear that since the voltage of resistor 16 increases as the thermocouple voltage increases and at the same time opposes the thermocouple voltage, the circuit described is self-stabilizing and automatically corrects the effects of changes in the characteristics of the circuit components.

As previously pointed out the purpose of battery 17 is to ensure that the voltage of the thermocouple circuit maintains a constant polarity throughout the temperature range to be covered. Such an arrangement would normally tend to decrease the sensitivity of the thermocouple. However, by reason of the self-balancing opposing voltage injected into the thermocouple circuit by the resistor 16, this desensitizing effect of the battery voltage is nullified and at the same time the constant polarity effect produced by the battery is retained.

Fig. 2 shows the circuit arrangement of a preferred form of the device of the invention. The device shown comprises a power transformer 50 having a primary winding 51, a low voltage winding 52 and a center-tapped high voltage winding 53, the latter being connected to a rectifier 54 and serving as a source of direct current for the device. A low-pass filter comprising resistors 55 and 56 and condensers 57 and 58 serves as a smoothing filter for the rectified current. Shunting the output of the direct current source is a voltage dividing element consisting preferably of two gas filled voltage regulator tubes 59 and 60 connected in series with their interconnection grounded.

A control tube 70 has its anode connected to the positive pole of the direct current source and its cathode connected to ground through a temperature calibrated meter 71 and a resistor 72. The sensitivity of the temperature indication and accordingly the width of the temperature range covered by the meter 71 is adjustable by resistors 73, 74 and 75 which are selectively placed in shunt with the meter by a switch 76. The steady state current of the tube 70 is balanced out of the meter 71 by a counter-voltage derived from the negative pole of the direct current source through a variable resistor 77.

Connected in shunt with the resistor 72 is a thermocouple circuit consisting of a resistor 78, a thermocouple 80, the contacts of an interrupter 81, and the primary winding of a transformer 82. The thermocouple circuit is essentially a low impedance circuit and typical values for the resistors 72 and 78 are 0.7 ohm and 0.5 ohm respectively.

Resistor 78 serves as a source of voltage functioning in the same manner as the battery 17 of Fig. 1 and for this purpose the resistor is connected to the positive pole of the direct current source through one of the resistors 83, 84 or 85 each of which has a different ohmic value and is adapted to correspondingly vary the voltage injected into the thermocouple circuit and thereby vary the lower temperature limit of the device. In general the greater the value of the voltage injected by the resistor 78 the lower will be the minimum temperature limit of the device.

In accordance with the preferred embodiment of the invention the resistor 78 further serves to automatically compensate the effects produced by changes in the temperature of the reference junction of the thermocouple. More particularly, resistor 78 consists of a material having such a temperature coefficient of resistivity that with changes in the ambient temperature thereof occurring simultaneously with changes in the temperature of the reference junction of the thermocouple, the voltage generated across the resistor varies in such a manner as to counter-balance the change in voltage of the thermocouple produced by the change in temperature of the reference junction. For example, when using a thermocouple 80 characterized by a decreasing thermal voltage with increases in the temperature of the reference junction, the resistor 78 consists of a material having a positive temperature coefficient of resistivity which brings about an increase in the resistor voltage corresponding to the decrease in the thermocouple voltage.

The voltage induced in the secondary of transformer 82 by intermittently interrupting the current in the thermocouple circuit by the interrupter 81, is amplified by a two stage amplifier comprising tubes 86 and 87 the circuit constants of which conform to accepted practice and a further description of which is believed unnecessary.

The amplified voltage appearing at the output of tube 87 is coupled through a condenser 89 to the anode of a rectifier tube 88. A resistor 90 connected between the cathode of tube 88 and ground through a resistor 91 serves as a load resistor for the tube 88 whereas a shunting resistor 92 serves as a direct current return for the tube 88. The junction of resistor 90 and tube 88 is connected to the grid electrode of control tube 70 through a low-pass filter consisting of a resistor 93 and by-pass condensers 94 and 95. Tube 88 is so poled that the voltage derived therefrom has a positive value and tends to decrease the normal operating bias voltage of the tube 70 produced across resistor 91 and derived from the negative pole the direct current supply through a variable resistor 96.

The device of the invention has been described in connection with a thermocouple serving as the temperature responsive element. However, it should be well understood that other forms of thermal responsive elements such as thermal responsive resistors adapted to generate a voltage proportional to the temperature to be indicated are equally suitable. Similarly, the invention also embraces the substitution of temperature recording or controlling instruments instead of the temperature calibrated meters 39 and 71 shown in Figs. 1 and 2 respectively.

While I have described my invention by means of specific examples and in specific embodiments I do not wish to be limited thereto for obvious modifications will occur to those skilled in the art without departing from the spirit and scope of the invention.

What I claim is:

1. A temperature responsive device comprising a source of variable potential, voltage generating means including a thermal voltage generating member, a polarizing voltage source, said voltage generating means and said polarizing voltage source being connected in series with each other and in shunt with said variable potential source and being so poled as to produce a resulting voltage opposing the voltage of the variable potential source, means to produce a pulsating voltage proportional to the difference between said resultant voltage and the voltage of the variable potential source, means to rectify said pulsating voltage, means responsive to said rectified voltage for varying the voltage of said variable potential source and means responsive to changes in the voltage of said variable potential source.

2. A temperature responsive device comprising a discharge tube having a cathode, a control electrode and an anode, a resistance element connected in the cathode-anode circuit of the discharge tube and adapted to generate a voltage proportional to the current in said tube, a thermal voltage generating member and a polarizing voltage source connected in series with each other and in shunt with said resistance element, said thermal voltage generating member and said polarizing source being so poled as to produce a resulting voltage opposing the voltage generated by said resistance element, means to produce a pulsating voltage proportional to the difference between said resultant voltage and the voltage generated by said resistance element, means to amplify said pulsating voltage, means to rectify the amplified pulsating voltage, means to apply the rectified voltage to the control electrode of said discharge tube, and means responsive to changes in the current in said discharge tube.

3. A temperature responsive device comprising a discharge tube having a cathode, a control electrode and an anode, a biasing voltage source connected to the control electrode for operating the discharge tube on the straight-line portion of its anode characteristic, a resistance element connected in the cathode-anode circuit of the discharge tube and adapted to generate a voltage proportional to the current in said tube, a thermocouple member and a polarizing voltage source connected in series with each other and in shunt with said resistance element, said polarizing voltage source having such a potential as to maintain a constant polarity in the series circuit throughout the operating temperature range of the thermocouple, said thermocouple and said polarizing source being so poled with respect to each other that the resulting voltage increases with increasing temperatures and opposes the voltage generated by said resistance element, means to produce a pulsating voltage proportional to the difference between said resultant voltage and the voltage generated by said resistance element, means to amplify said pulsating voltage, means to rectify the amplified pulsating voltage, means to apply the rectified voltage to the control electrode of said discharge tube in opposition to said biasing voltage, and means responsive to changes in the current in said discharge tube.

4. A temperature responsive device comprising a discharge tube having a cathode, a control electrode and an anode, a resistance element connected in the cathode-anode circuit of the discharge tube and adapted to generate a voltage proportional to the current in said tube, a thermal voltage generating member having a measuring junction and a reference junction, a polarizing source connected in series with said thermal generating member and being so poled with respect thereto that the resulting voltage increases with increases in the temperature of the measuring junction and having such a thermal voltage coefficient as to compensate for voltage changes produced by changes in the temperature of the reference junction, said thermal generating member and polarizing source being connected in shunt with said resistance element and being so poled as to oppose the voltage generated by the resistance element, means to produce a pulsating voltage proportional to the difference between said resultant voltage and the voltage generated by said resistance element, means to amplify said pulsating voltage, means to rectify the amplified pulsating voltage, means to apply the rectified voltage to the control electrode of said discharge tube, and means responsive to changes in the current in said discharge tube.

5. A temperature responsive device comprising a discharge tube having a cathode, a control electrode and an anode, a biasing voltage source connected to the control electrode for operating the discharge tube on the straight-line portion of its characteristic, a resistance element connected in the cathode-anode circuit of the discharge tube and adapted to generate a voltage proportional to the current in said tube, a thermocouple member having a measuring junction and a reference junction, a resistance element connected in series with the thermocouple, means to energize said second resistance element to produce a polarizing voltage so poled with respect to the voltage generated by the thermocouple that the resultant voltage increases with increases in the temperature of the measuring junction, said second resistance element having such a thermal coefficient of resisitivity as to produce changes in the polarizing voltage compensating voltage changes produced by changes in the temperature of the reference junction, said thermocouple and second resistor being connected in shunt with said first resistance element and being so poled with respect thereto as to oppose the voltage generated by said first resistance element, means to periodically interrupt said shunt connection and to produce a pulsating voltage proportional to the voltage difference between said resultant voltage and the voltage generated by said first resistance element, means to amplify said pulsating voltage, means to rectify the amplified pulsating voltage, means to apply the rectified voltage to the control electrode of said discharge tube in opposition to said biasing voltage, and means responsive to changes in the current in said discharge tube.

6. A temperature responsive device comprising a source of variable potential, thermal voltage generating means having a measuring junction and a reference junction, a polarizing voltage source connected in series with the thermal voltage generating means and having such a thermal voltage coefficient as to compensate for voltage changes of the thermal voltage generating means produced by changes in the temperature of the reference junction, said thermal voltage generating means and said polarizing source being connected in shunt with the source of variable potential and being so poled as to produce a resulting voltage opposing the voltage of the variable potential source, means to produce a pulsating voltage proportional to the difference between said resultant voltage and the voltage of the said variable potential source, means to rectify said pulsating voltage, means responsive to the rectified voltage for varying the voltage of said variable potential source, and means responsive to changes in the voltage of the variable potential source.

7. An electrical device responsive to a voltage derived from a quantity to be measured, comprising a source of variable potential, a polarizing voltage source, means to connect the voltage derived from the said quantity in series with the polarizing voltage to produce a resultant voltage, means to connect said resultant voltage in shunt with the source of variable potential in such sense that the said resultant voltage opposes the voltage of the variable potential source, means to produce a pulsating voltage proportional to the difference between said resultant voltage and the voltage of the variable potential source, means to rectify said pulsating voltage, means responsive to said rectified voltage for varying the voltage of the variable potential source, and means responsive to changes in the voltage of the variable potential source.

WILLIAM B. GAYLORD.